United States Patent
Sasaki et al.

(10) Patent No.: US 6,302,431 B1
(45) Date of Patent: *Oct. 16, 2001

(54) AIR BAG DEVICE

(75) Inventors: Hiroshi Sasaki; Kasumi Seo, both of Kanagawa-ken (JP)

(73) Assignee: Nissan Motor Co., Ltd., Yokohama (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,387
(22) PCT Filed: Sep. 18, 1998
(86) PCT No.: PCT/JP98/04231
§ 371 Date: May 18, 1999
§ 102(e) Date: May 18, 1999
(87) PCT Pub. No.: WO99/15366
PCT Pub. Date: Apr. 1, 1999

(30) Foreign Application Priority Data

Sep. 19, 1997 (JP) .................................................. 9-255657

(51) Int. Cl.⁷ .................................................. B60R 21/22
(52) U.S. Cl. .................................... 280/728.2; 280/743.1; 280/730.2
(58) Field of Search .............................. 280/730.2, 728.2, 280/728.1, 730.1, 743.1

(56) References Cited

U.S. PATENT DOCUMENTS

| | | | |
|---|---|---|---|
| 5,149,130 | * 9/1992 | Wooley et al. | 280/736 |
| 5,308,110 | * 5/1994 | Kokeguchi | 280/728.1 |
| 5,566,972 | * 10/1996 | Yoshida et al. | 280/728.2 |
| 5,586,782 | 12/1996 | Zimmerman, II et al. | |
| 5,791,682 | * 8/1998 | Hiramitsu et al. | 280/728.2 |
| 5,848,804 | * 12/1998 | White, Jr. et al. | 280/743.1 |
| 6,074,003 | * 6/2000 | Umezawa et al. | 297/216.1 |

FOREIGN PATENT DOCUMENTS

| | | |
|---|---|---|
| 2-169344 | 6/1990 | (JP) . |
| 3-112746 | 5/1991 | (JP) . |
| 5-178150 | 7/1993 | (JP) . |
| 7-108890 | 4/1995 | (JP) . |
| 7-205749 | 8/1995 | (JP) . |
| 8-207689 | 8/1996 | (JP) . |

* cited by examiner

Primary Examiner—Paul N. Dickson
Assistant Examiner—Faye M. Fleming
(74) Attorney, Agent, or Firm—McDermott, Will & Emery

(57) ABSTRACT

There are provided an inflator 31; a cylindrical holder 32 where the inflator 31 is accommodated inside; and a bag-shaped airbag 35 accommodating the holder at it's opening portion 34 and folded in an ordinary situation to be expandable by a gas G discharged from the inflator 31, wherein a protecting cloth 50 distinct from the airbag 35 is arranged on an inner face of the opening portion 34 of the airbag 35.

4 Claims, 5 Drawing Sheets

AIR BAG DEVICE

TECHNICAL FIELD

The present invention relates to an-airbag apparatus which instantaneously expands to protect a passenger of his/her own automobile at a time of a collision of an automobile, particularly so-called a lateral collision where another automobile collides against a side portion of his/her own automobile.

BACKGROUND ART

As an airbag apparatus for protecting a passenger, there is, for example, one disclosed in U.S. Pat. No. 5,586,782 or one disclosed in Japanese Patent Application Laid-Open No. 8-207689.

The former, namely an airbag apparatus for lateral collision (DUAL PRESSURE SIDE IMPACT AIRBAG) disclosed in U.S. Pat. No. 5,586,782, is configured such that, at a time of a lateral collision of an automobile, an electrical signal is transmitted to an inflator via a harness for ignition when the collision is detected, gas generated from the inflator ignited is introduced from a gas discharging hole into an airbag folded to be accommodated within a case body in a backrest in an ordinary situation of the automobile to expand the same, the expanded airbag presses and opens a lid of the case body, and the airbag is spread between a passenger and a passenger compartment side wall, so that an impact generated when the passenger secondarily collides against the passenger compartment side wall is absorbed by the airbag.

The airbag is structured such that a bag body formed in a generally L-shaped configuration with a head protecting portion and a chest protecting portion is divided into a gas passage to the head protecting portion and a gas passage to the chest protecting portion by a dividing plate or a sewn portion, and the gas discharged from the inflator is filled into the respective protecting portions in a short time.

Also, the latter, namely an airbag for lateral collision disclosed in Japanese Patent Application Laid-Open No. 08-207689, is structured such that an airbag is folded and accommodated within a backrest in an ordinary situation of an automobile, like the former, and at a time of a lateral collision of an automobile the airbag is abruptly expanded by discharged gas rapidly from an inflator into the airbag via a supporting pipe so that an impact generated when a passenger secondarily collides against a passenger compartment side wall is absorbed by the airbag.

However, in a structure of such a conventional airbag apparatus, as the inflator (the former) or the supporting pipe (the latter) is housed in the airbag of the airbag apparatus from an opening portion thereof, there is a risk that an inner face of the airbag may be injured by friction between the airbag and an edge portion of the inflator or a holder for holding the inflator inside the airbag.

Also, the gas discharged from the inflator tends to concentrate on the vicinity of an inflator-mounting portion positioned at the opening portion of the airbag, which is required to be improved.

The present invention has been achieved in view of the problems in such a conventional art, and an object thereof is to provide an airbag apparatus which prevents the friction between the airbag and the edge portion of the inflator or the holder for holding the inflator inside the airbag and the injury of the airbag due to a high temperature gas discharged from the inflator.

DISCLOSURE OF INVENTION

In order to achieve the above object, the invention of a first aspect comprises: an inflator; and an airbag accommodating the inflator at its opening portion and folded in an ordinary situation to be expandable by a gas discharged from the inflator, wherein a protecting cloth distinct from the airbag is arranged on an inner face of the opening portion of the airbag.

According to the invention of the first aspect, the airbag can be prevented by means of the protecting cloth from being injured by friction between the airbag and an edge portion of the inflator and a high temperature gas discharged from the inflator.

The invention of a second aspect comprises: an inflator; a cylindrical holder inside which the inflator is accommodated; and an airbag accommodating the inflator at its opening portion and folded in an ordinary situation to be expandable by the gas discharged from the inflator, wherein a protecting cloth distinct from the airbag is arranged on an inner face of the opening portion of the airbag.

According to the invention of the second aspect, the airbag can be prevented by means of the protecting cloth from being injured by friction between the airbag and an edge portion of the holder for holding the inflator inside and a high temperature gas discharged from the inflator.

As a preferred aspect, a portion of the protecting cloth positioned at a side which is supported by an inside part of an automobile is thicker than a portion of the protecting cloth positioned at a side which is not supported by the inside part.

According to this aspect, even when friction occurs between the airbag and an edge portion of the inflator or the holder, there is a margin where the friction can freely be avoided in the portion of the protecting cloth positioned at the side which is not supported by the inside part, whereby the airbag itself can securely be protected by making thick the portion of the airbag positioned at the side where there is not the margin. Also, the portion of the protecting cloth positioned at the side which is supported by the inside part which is apt to be influenced by the high temperature gas discharged from the inflator is made thick, so that the airbag itself can securely be protected.

Also, as a preferred aspect, a heat resistant temperature at a portion of the protecting cloth positioned at a side which is supported by an inside part of an automobile is higher than that at a portion of the protecting cloth positioned at a side which is not supported by the inside part.

According to this aspect, even when friction occurs between the airbag and the edge portion of the inflator or the holder, as the portion of the protecting cloth positioned at the side which is not supported by the inside part is apt to be air-cooled, the heat resistant temperature of the portion of the protecting cloth positioned at the side which is supported by the inside part is made high, so that the airbag itself can securely be protected.

As a further preferred aspect, the opening portion of the airbag is formed so as to be overlapped at its supporting portion for supporting the inflator or the holder accommodating the inflator inside thereof, and a reinforcing cloth which is to resist against the heat of the gas discharged from the inflator is held on the overlapped portion.

According to this aspect, as the airbag is prevented from being injured by direct discharge of the inflator without increasing the number of component parts, the number of airbag forming steps such as sewing can remarkably be reduced.

BRIEF DESCRIPTION OF DRAWINGS

FIG. 4 is an exploded side view of only the airbag of FIG. 2 at an expanded time, a holder, and the like;

BEST MODE FOR CARRYING OUT THE INVENTION

Figure 1:
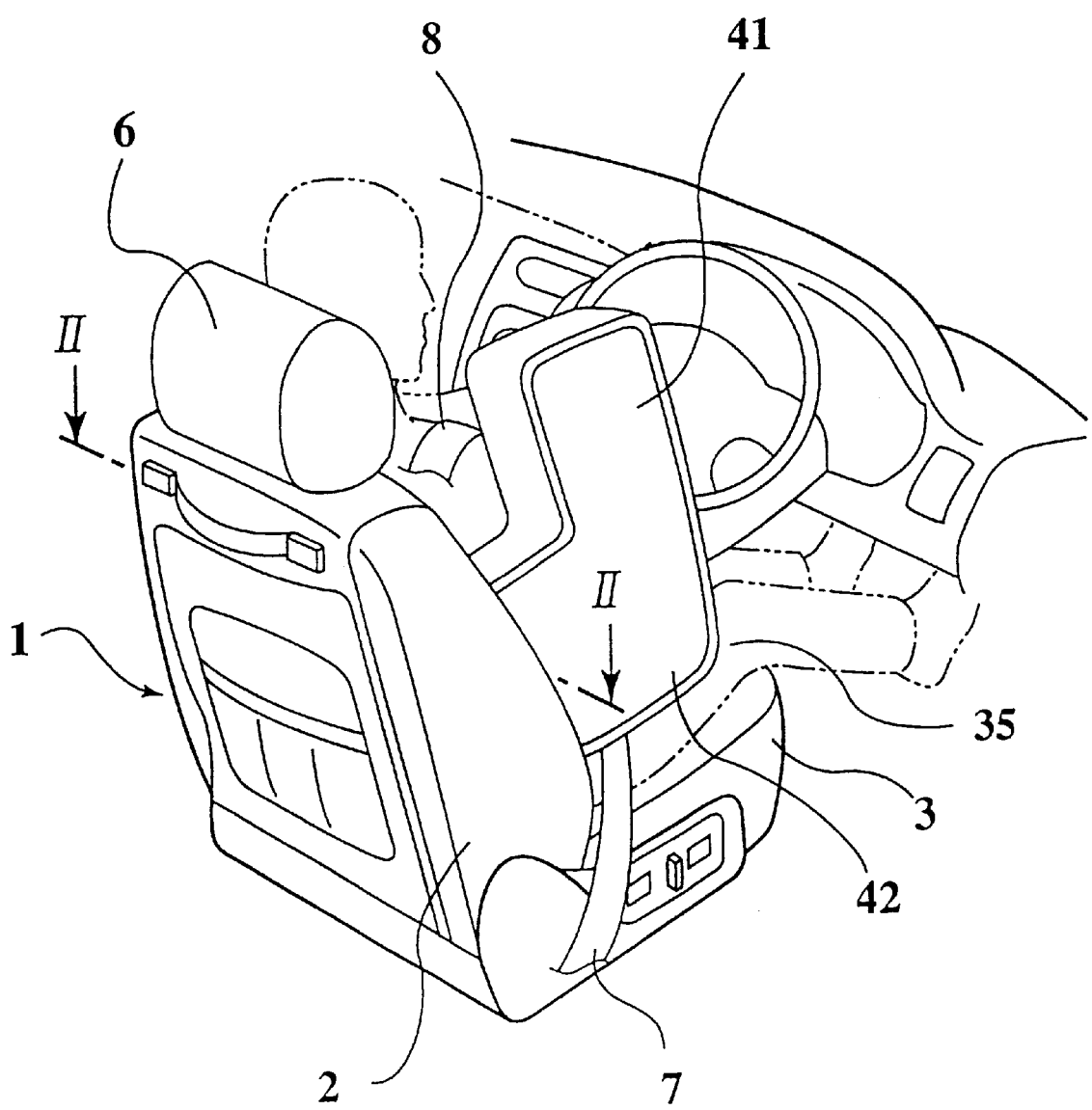
FIG. 1 is a whole perspective view of a seat mounted with an airbag apparatus according to an embodiment of the present invention.
Figure 2:
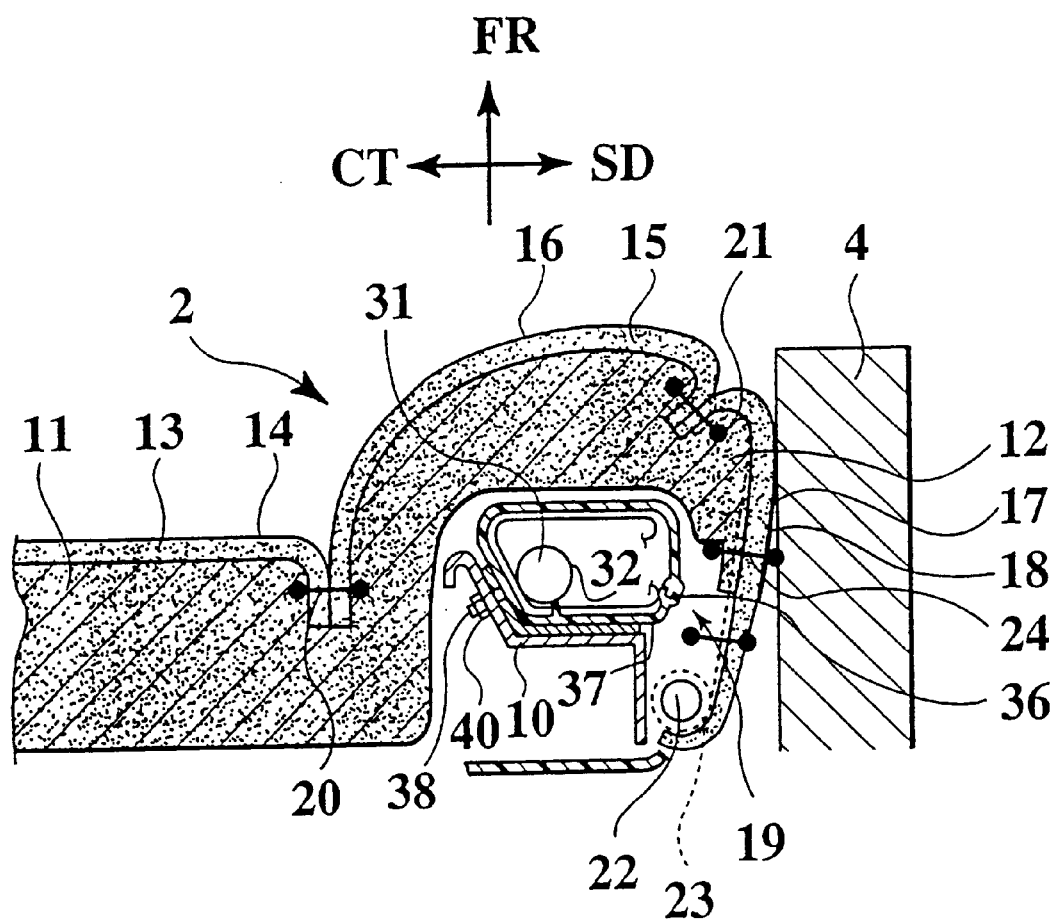
FIG. 2 is a sectional view taken along line II—II in FIG. 1.

FIGS. 1 to 6 show an embodiment. As shown in. FIGS. 1 and 2, a seat 1 comprises a backrest 2 and a seat cushion 3, and the backrest 2 is arranged at a position opposing to a passenger compartment inner side wall 4 such as a door trim, a center pillar inner panel 5 or the like. A reference character 6 denotes a head rest, a reference character 7 denotes a lap belt, and a reference character 8 denotes a shoulder belt.

Figure 3:
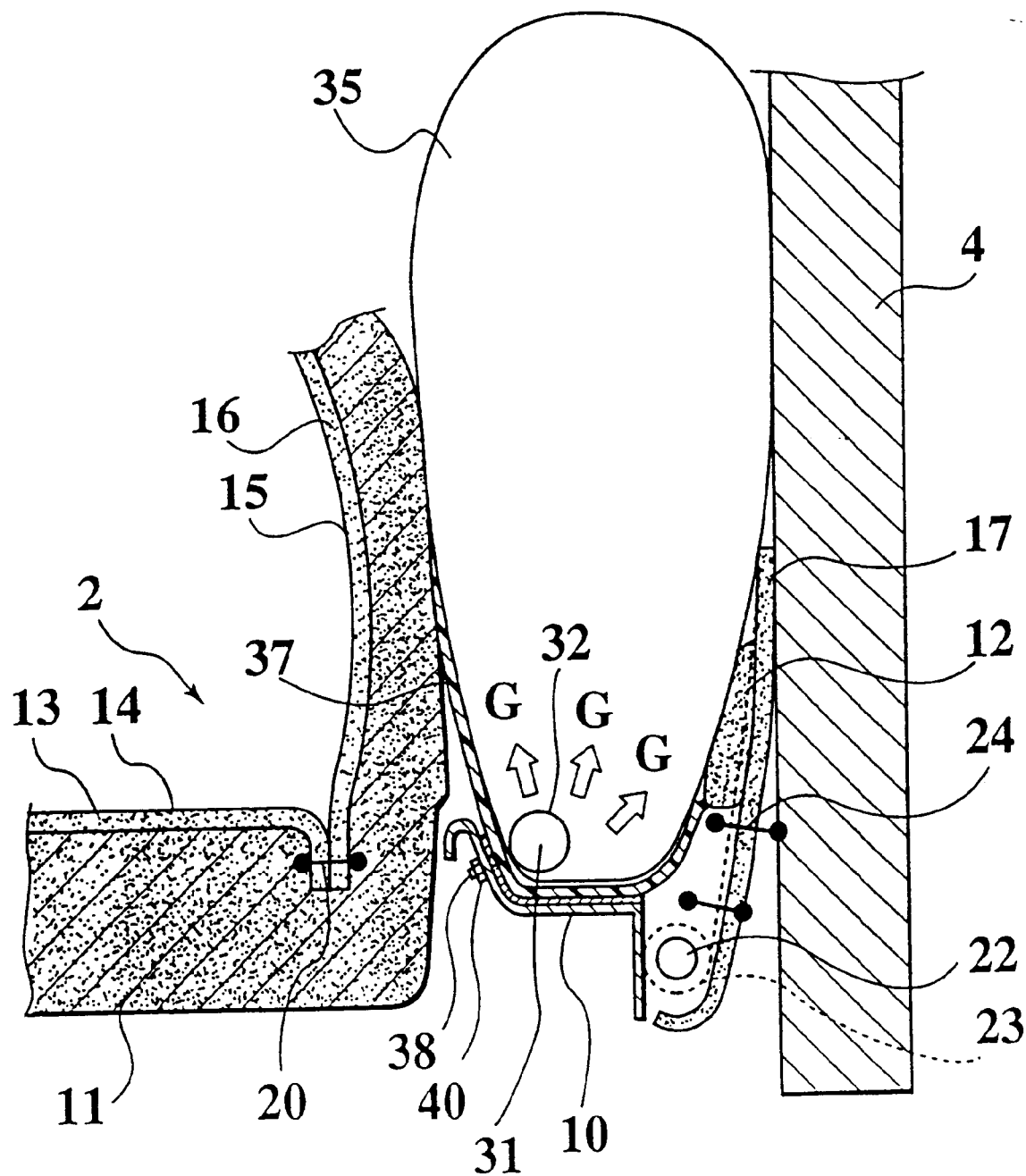
FIG. 3 is a sectional view showing a state where an airbag has been expanded from a state shown in FIG. 2.

As shown in FIGS. 2 and 3, the backrest 2 comprises a backrest frame 10; a cushion pad 11 arranged at a front side FR of the backrest frame 10; a side cushion 12 arranged on a side SD of the backrest frame 10; a first shock absorbing member 13 of a slab urethane type arranged at the front side FR of a central portion CT of the cushion pad 11; a first outer skin 14 covering the first shock absorbing member 13; a second shock absorbing member 15 of a slab urethane type arranged at the front side FR on the side SD of the cushion pad 11; a second outer skin 16 covering the second shock absorbing member 15; a third shock absorbing member 17 of a slab urethane type arranged on the side SD of the side cushion 12; a third outer skin 18 covering the third shock absorbing member 17; an airbag apparatus 19 arranged between a side portion of the cushion pad 11 and an inner face of the side cushion 12 by means described later; a sewn portion 20 holding the first shock absorbing member 13, the first outer skin 14, the second shock absorbing member 15, and the second outer skin 16; an opening and rupturing portion 21 configured by sewing the second shock absorbing member 15, the second outer skin 16, the third shock absorbing member 17, and the third outer skin 18 so as to be ruptured by a predetermined pressure; a cloth-like protecting member 23 for protecting the side cushion 12, one side of which is sewn to the opening and rupturing portion 21, the other side thereof being held by a wire of the backrest frame 10; and a sewn portion 24 holding the side cushion 12, the third shock absorbing member 17 and the third outer skin 18.

Figure 4:
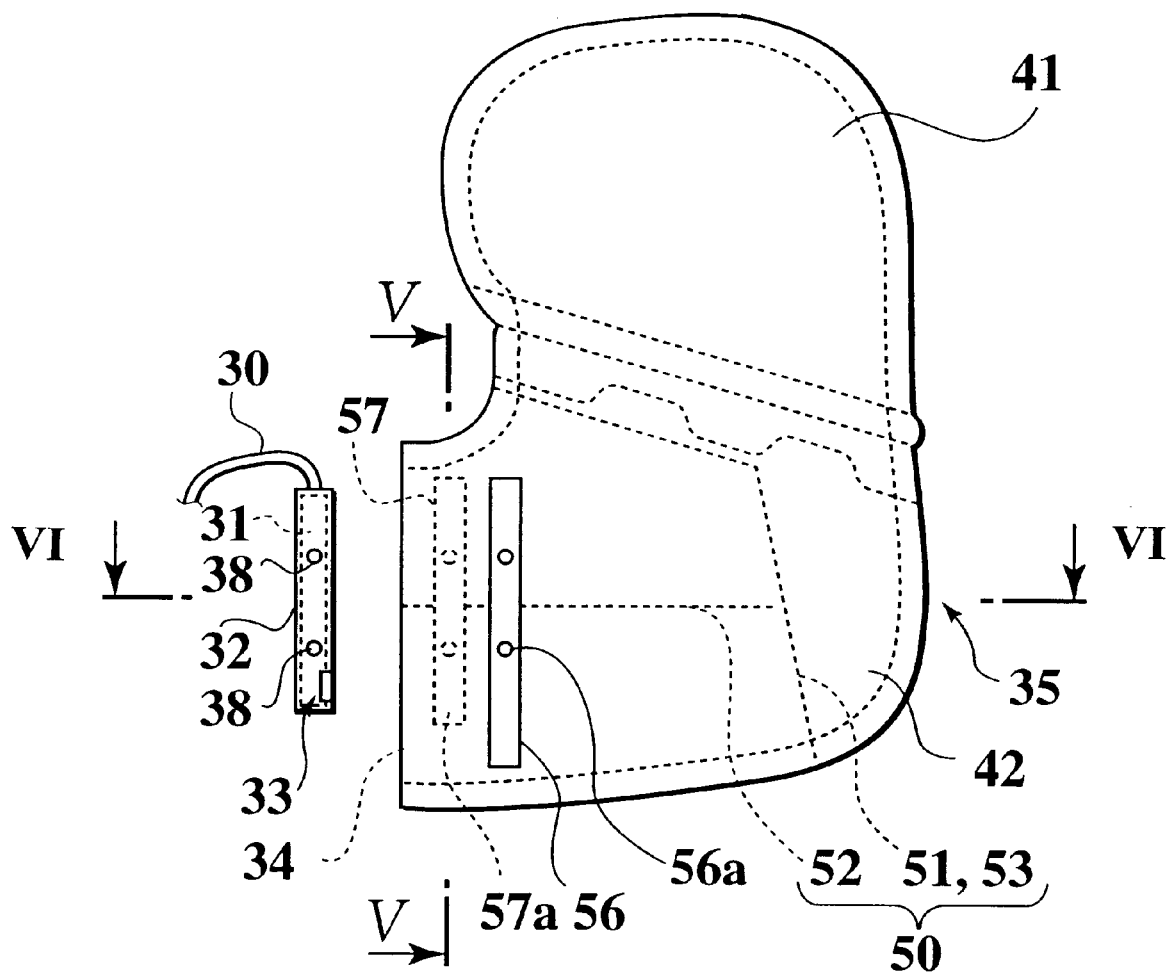
Figure 5:
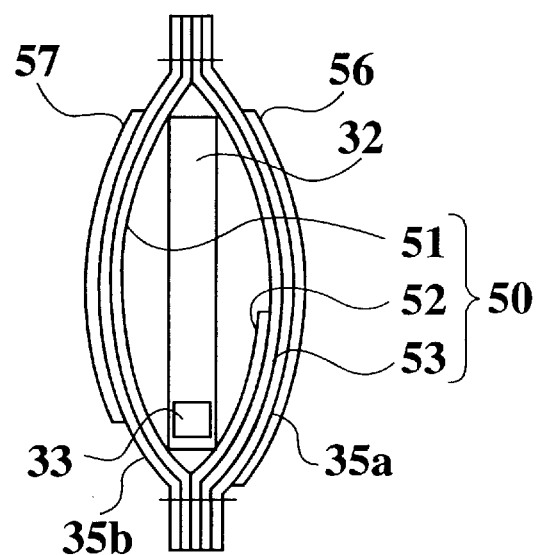
FIG. 5 is a sectional view taken along line V—V in FIG. 4.

As shown in FIG. 4, the airbag apparatus 19 comprises a vertically elongated cylindrical holder 32 where an inflator 31 is accommodated, the inflator being capable of being ignited by transmission of a collision electric signal from an unillustrated sensor through an ignition harness 30; an airbag 35 arranged such that its opening portion 34 faces a discharging hole 33 of the holder 32 and folded in an ordinary situation of an automobile to be expandable by a gas G discharged from the inflator 31; and a case body 37 (refer to FIG. 2) made of synthetic resin, the case body 37 covering the holder 32 and the airbag 35 and having an opening portion 36 rupturable by expansion of the airbag 35.

Figure 6:
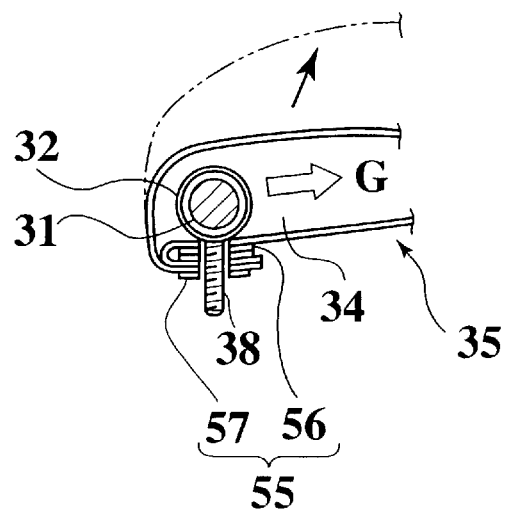
FIG. 6 is a sectional view taken along line VI—VI after a bolt member 38 is inserted into through holes 56a and 57a of a first reinforcing cloth 56 and a second reinforcing cloth 57.

As shown in FIGS. 4 and 6, bolt members 38 are provided in a projecting manner on the holder 32. The bolt members 38 are exposed outside via unillustrated through holes of the case body 37 and they are inserted into unillustrated through holes to be screwed to nuts 40. At this time, the discharging hole 33 of the holder 32 faces on the front side FR and it is arranged at a lower side DW.

As shown in FIG. 1, the airbag 35 is formed in a bag shape so as to be expandable in a generally L configuration with a head protecting portion 41 and a chest protecting portion 42 by the gas G discharged from the inflator 31, and it is folded in an ordinary situation of an automobile.

A protecting cloth 50 distinct from the airbag 35 is arranged on an inner face of the opening portion 34 of the airbag 35.

The protecting cloth 50 comprises a first protecting cloth 51 attached to an inner face of the airbag 35 positioned at a side (a side opposed to or facing a side which is supported by an inside part) which is not supported by the backrest frame 10 or the like and a second protecting cloth 52 and a third protecting cloth 53 attached in layers to an inner face of the airbag 35 positioned at a side which is supported by the inside part. The plate thickness of the second and third protecting cloth 52 and 53 is thicker than that of the first protecting cloth 51. The second and third protecting cloth 52 and 53 are not put in layers but they may be configured in one piece.

In the protecting cloth 50, the heat resistant temperatures of the second and third protecting cloth 52 and 53 are preferably higher than that of the first protecting cloth 51.

The first protecting cloth 51 and the third protecting cloth 53 are respectively formed in the almost same size as those of the left and the right cloth 35a and 35b configuring the airbag 35. The second protecting cloth 52 is arranged at a position nearest to the inflator 31, and it is formed in a size approximating to the discharging hole 33, namely half a vertical size of each of the first protecting cloth 51 and the third protecting cloth 53.

The opening portion 34 of the airbag 35 is folded at a supporting portion 55 for supporting the inflator 31 or the holder 32 accommodating the inflator 31 therein so as to be overlapped, and a first reinforcing cloth 56 and a second reinforcing cloth 57 capable of resisting against the heat of the gas discharged from the inflator 31 are held on the supporting portion 55 thus overlapped. A reference characters 56a and 57a are through holes formed on the first reinforcing cloth 56 and the second reinforcing cloth 57 so as to be insertable with the bolt members 38, respectively. As shown with a cross-sectional view of the airbag apparatus in FIG. 6, the first reinforcing cloth 56 is positioned nearer to the holder 32 than the second reinforcing cloth 57. Accordingly, even when the airbag 35 is injured by a corner of the discharging hole 33 side of the inflator 31, the airbag 35 is prevented from being worn out by extending the first reinforcing cloth 56 sufficiently towards the discharging hole 33 side of the inflator 31, and the airbag 35 itself is securely protected so that the airbag can securely be spread.

As the embodiment of the invention is structured in the above manner, when the inflator 31 is ignited by any signal so that the gas G is discharged from the discharging hole 33 of the holder 32 as shown with a white arrow in FIG. 3, the airbag 35 which has been folded in an ordinary situation, particularly the chest protecting portion 42, is rapidly expanded towards the front side FR of the automobile by the gas G discharged from the inflator 31, and the opening portion 36 of the case body 37 covering the airbag 35 is put in a ruptured state, so that the case body 37 is opened in a linear shape and the airbag 35 is further expanded.

That is, as the chest protecting portion 42 of the airbag 35 which has been folded in the ordinary situation is first expanded and then the gas can be introduced into the head protecting portion 41 side, the chest protecting portion 42 enters securely in between the chest of a passenger, and the door trim 4 and the center pillar inner panel 5, so that a secondary collision energy of the passenger against the door trim 4 and the center pillar inner panel 5 can sufficiently be absorbed.

Injury of the airbag 35 due to friction between the airbag 35 and the edge portion of the holder 32 holding the inflator inside and the high temperature gas G discharged from the inflator 31 can be prevented by the protecting cloth 50.

Even when friction occurs between the airbag and the edge portion of the inflator 31 or the holder 32, as the cloth 35b of the airbag 35 positioned at the side which is not supported by the inside part has a margin where it can avoid the friction freely, the cloth 35a of the airbag 35 positioned at the side in which there is not the margin is made thicker by the third protecting cloth 53, thereby allowing a secure protection of the airbag 35 itself.

Also, the cloth 35a of the airbag 35 positioned at the side which is supported by the inside part which is apt to be influenced by the high temperature gas G discharged from the inflator 31 is made thicker, thereby allowing a secure protection of the airbag 35 itself.

Even when friction occurs between the airbag and the edge portion of the inflator 31 or the holder 32, as the cloth 35b of the airbag 35 positioned at the side which is not supported by the inside part is apt to be air-cooled. Accordingly, the heat resistant temperature of the cloth 35a of the airbag 35 positioned at the side which is supported by the inside part is made higher, thereby allowing a secure protection of the airbag 35 itself.

As the injury of the airbag 35 due to direct discharge of the gas G from the inflator 31 can be prevented without increasing the number of component parts, the number of steps for forming the airbag 35 such as sewing can remarkably be reduced.

The above explanation is directed to an explanation of the case where the holder 32 is used, but the invention may be structured such that the inflator 31 is arranged directly at the opening portion 34 of the airbag 35. Even in such a case, the injury of the airbag 35 due to the friction between the airbag and the edge portion of the inflator 31 and the high temperature gas G discharged from the inflator 31 can be prevented by the protecting cloth 50.

INDUSTRIAL APPLICABILITY

As mentioned above, the airbag apparatus according to the present invention is useful as an apparatus for protecting a passenger at a time of collision of an automobile.

What is claimed is:

1. An airbag apparatus for lateral collision comprising:

a normally folded airbag having a first base cloth and a second base cloth sewn to each other to define an opening portion;

an inflator device for discharging a gas to expand the airbag, the inflator device being accommodated inside the opening portion, the inflator device having an edge and being supported via the first base cloth; and a protecting cloth separated from the airbag, the protecting cloth having a first protecting cloth and a second protecting cloth, the first protecting cloth being arranged on the first base cloth inside the opening portion, the second protecting cloth being arranged on the second base cloth inside the opening portion;

wherein a section of the airbag including both the first base cloth and second base cloth portions defining the opening portion is folded back over the first base cloth and positioned corresponding to the inflator device, and wherein the airbag apparatus further comprises a reinforcing cloth, the reinforcing cloth being held on the end of the opening portion.

2. An airbag apparatus according to claim 1, wherein said reinforcing cloth comprises a first reinforcing cloth disposed on an outer surface of the first base cloth.

3. An airbag apparatus according to claim 2, wherein said reinforcing cloth further comprising a second reinforcing cloth attached to an outer surface of the second base cloth.

4. An airbag apparatus according to claim 3, wherein said first reinforcing cloth and said second reinforcing cloth are disposed to substantially align with one another when the opening portion of the airbag is folded back over the first base cloth.

* * * * *